United States Patent [19]

Hoshino et al.

[11] Patent Number: 5,438,403
[45] Date of Patent: * Aug. 1, 1995

[54] ARTICLE IDENTIFICATION SYSTEM

[75] Inventors: Hidekazu Hoshino; Hidemi Haga, both of Kanagawa, Japan

[73] Assignee: NHK Spring Co., Ltd., Japan

[*] Notice: The portion of the term of this patent subsequent to Sep. 13, 2011 has been disclaimed.

[21] Appl. No.: 36,019

[22] Filed: Mar. 23, 1993

[30] Foreign Application Priority Data

Apr. 28, 1992 [JP] Japan .................... 4-137786

[51] Int. Cl.6 ............... G06K 7/10; G02B 27/38
[52] U.S. Cl. ......................... 356/71; 359/2; 283/86; 283/90
[58] Field of Search ............... 356/71; 359/2; 283/86, 283/87, 90, 94

[56] References Cited

U.S. PATENT DOCUMENTS

| | | | |
|---|---|---|---|
| 4,034,211 | 7/1977 | Horst et al. | 235/61.12 |
| 4,129,382 | 12/1978 | Greenaway | 356/71 |
| 4,163,570 | 8/1979 | Greenaway | 283/8 |
| 4,183,665 | 1/1980 | Iannadrea et al. | 356/71 |
| 4,211,918 | 7/1980 | Nyfeler et al. | 235/454 |
| 4,472,627 | 9/1984 | Weinberger | 235/487 |
| 4,501,439 | 2/1985 | Antes | 283/91 |
| 4,514,085 | 4/1985 | Kaye | 356/71 |
| 4,537,504 | 8/1985 | Baltes et al. | 356/71 |
| 4,659,112 | 4/1987 | Reiner et al. | 283/90 |
| 4,794,585 | 12/1988 | Lee | 369/112 |
| 4,896,901 | 1/1990 | Ekelund | 283/90 |
| 4,906,829 | 3/1990 | Iseli | 235/454 |
| 5,004,327 | 4/1991 | Rosen | 283/90 |
| 5,010,243 | 4/1991 | Fukushima et al. | 283/86 |
| 5,034,616 | 7/1991 | Bercovitz | 356/71 |
| 5,044,707 | 9/1991 | Mallik | 283/86 |
| 5,101,184 | 3/1992 | Antes | 235/454 |
| 5,237,164 | 8/1993 | Takada | 235/487 |
| 5,267,753 | 12/1993 | Chock | 359/2 |

FOREIGN PATENT DOCUMENTS

| | | | |
|---|---|---|---|
| 61-176969 | 8/1986 | Japan | 359/2 |
| 61-182580 | 11/1986 | Japan | 356/71 |
| 2-212193 | 8/1990 | Japan | 283/86 |
| 2-261694 | 10/1990 | Japan | 283/86 |
| 3-71383 | 3/1991 | Japan | 356/71 |
| 93-00224 | 1/1993 | WIPO | 283/86 |

Primary Examiner—William Mintel
Assistant Examiner—Minhloan Tran
Attorney, Agent, or Firm—Skjerven, Morrill, MacPherson, Franklin & Friel; Alan H. MacPherson; Omkar K. Suryadevara

[57] ABSTRACT

Provided is a system for identifying the authenticity of an article which is reliable, and would not restrict the freedom of design. An identification region is defined on the article for identification purpose. The identification region comprises a light reflecting layer which is adapted to transmit visible light and reflect light of a certain wavelength other outside the visible light band with a certain diffractive property. Therefore, the identification region is hardly visible to human eyes, and this not only discourages an attempt to counterfeit the identification region but also would not affect the external appearance of the article. Further, the visible light which has passed through the reflecting layer and reflected by the surface of the article itself or an underlying layer is prevented from reaching the light detecting device so that spurious noises which may disturb the identification process can be eliminated.

7 Claims, 5 Drawing Sheets

ARTICLE IDENTIFICATION SYSTEM

CROSS REFERENCE TO RELATED CO-PENDING APPLICATIONS

The following co-pending patent applications are directed to subject matters similar to those of the present application, and are commonly assigned to NHK Spring Co., Ltd. The contents of these applications are hereby incorporated in the present application by reference.

| Application Number | Filing Date | Remarks |
| --- | --- | --- |
| 07/547,936 | July 3, 1990 | abandoned |
| 07/782,976 | October 24, 1991 | CIP of 07/547,936, now U.S. Pat. No. 5,200,794 |
| 07/788,569 | November 6, 1991 | CIP of 07/547,936, now U.S. Pat. No. 5,291,006. |
| 07/930,583 | August 14, 1992, | pending |
| 07/998,067 | December 23, 1992, | now U.S. Pat. No. 5,347,111. |

TECHNICAL FIELD

The present invention relates to an identification system for identifying the authenticity of an article.

BACKGROUND OF THE INVENTION

Conventionally, as means for identifying the authenticity of such articles as information storage cards including magnetic cards, stocks and bonds, tickets and commercial goods, a system of affixing a hologram marking, which is difficult to forge, on the article to be identified as an identification seal was proposed, for instance, in Japanese utility model laid-open publication No. 61-182580. As such identification seals are intended to be visually identified, they are normally affixed to the parts of articles to be identified which are easily noticeable from outside. Therefore, because designing of the external appearance of an article must take into account the position, shape and color of the identification seal that is going to be affixed thereto, freedom of design can be severely hampered, and in some cases the identification seal may destroy the balance in the design to such an extent that the appearance of the article may be severely impaired.

In Japanese patent laid-open publication No. 3-71383 filed by the applicant of this application, it was proposed to provide, on the surface of an article, a hologram region serving as an identification seal having a diffractive property unique to the article. In Japanese patent application No. 3-259636 (not yet published) filed by the same applicant and directed to an invention using the above-mentioned structure, an identification region made of a material which reflects, with a unique diffractive property, only the light having a prescribed wavelength, for instance light in the infrared band, which is not in the range of visible light, is affixed to such articles as information storage cards, stocks and bonds and tickets so that the identification region is normally transparent, but can be optically identified by using detecting light having the prescribed wavelength. According to this structure, the authenticity of the article can be identified with high accuracy, the forgery of the identification region is made more difficult, and the freedom in the design of the article is not in any way hampered.

However, in reality, it is difficult to obtain a layer which reflects only the light of a certain wavelength to a high degree, and the light to be reflected may well partly penetrate the layer and may be reflected by the surface of the article itself. In particular, when the surface of the article is metallic, and has a high reflective coefficient, the light reflected by the surface of the article may reach the light receiving region of the identification system along with the light reflected by the identification region whereby an erroneous detection may be resulted, and an authentic article may not be identified as such.

BRIEF SUMMARY OF THE INVENTION

In view of such problems of the prior art, a primary object of the present invention is to provide an article identification system which allows the authenticity of an article to be identified reliably without disturbing the external appearance of the article.

A second object of the present invention is to provide an article identification system which allows the authenticity of an article to be identified reliably without restricting the design of the article.

A third object of the present invention is to provide an article identification system which uses an identification region to be placed on an article to be identified, but this identification region is so inconspicuous that it would not attract the attention of the potential forger, and the possibility of the identification region to be counterfeited is reduced.

These and other objects of the present invention can be accomplished by providing an article identification system for identifying the authenticity of an article, comprising: identification means provided on the article; light emitting means for impinging light emitted therefrom onto the identification means, the light having a prescribed wavelength, and linearly polarized in a prescribed direction; light detecting means for detecting light reflected by the identification means; and control means for evaluating light detected by the light detecting means and determining the authenticity of the article associated with the identification means; wherein: the identification means includes at least a first layer having a reflective property adapted to be detected by the light detecting means for identification purpose, and an underlying second layer which is at least semi-transparent; the light detecting means being provided with a filter which selectively allows transmission of light having a certain polarization direction, and the second layer being provided with such a polarization plane rotating property that light which has passed through the first and second layers and reflected by a third layer or a surface of the article itself onto the light detecting means is substantially prevented from passing through the filter. Typically, the light reflecting layer consists of hologram or diffraction grating.

Therefore, the visible light which has passed through the reflecting layer and reflected by the surface of the article itself or an underlying layer is prevented from reaching the light detecting device so that spurious noises which may disturb the identification process can be effectively eliminated. To effectively eliminate the influences of the component of light which has passed through the reflecting layer, and reduce spurious noises due to such a component of light, the second layer preferably has such a polarization plane rotating property that polarized light which has passed through the second layer twice has a polarization direction rotated by approximately 90 degrees while the filter provided on the light detecting means is so oritented as to shut off the light which has had a polarization direction thereof rotated by 90 degrees by the second layer.

According to a preferred embodiment of the present invention, the wavelength of the light emitted from the light emitting means is outside a visible light band, and the first layer reflects the light from the light emitting means but is substantially transparent to visible light. Thus, the identification region is hardly visible to human eyes, and this not only discourages an attempt to counterfeit the identification region but also would not affect the external appearance of the article.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
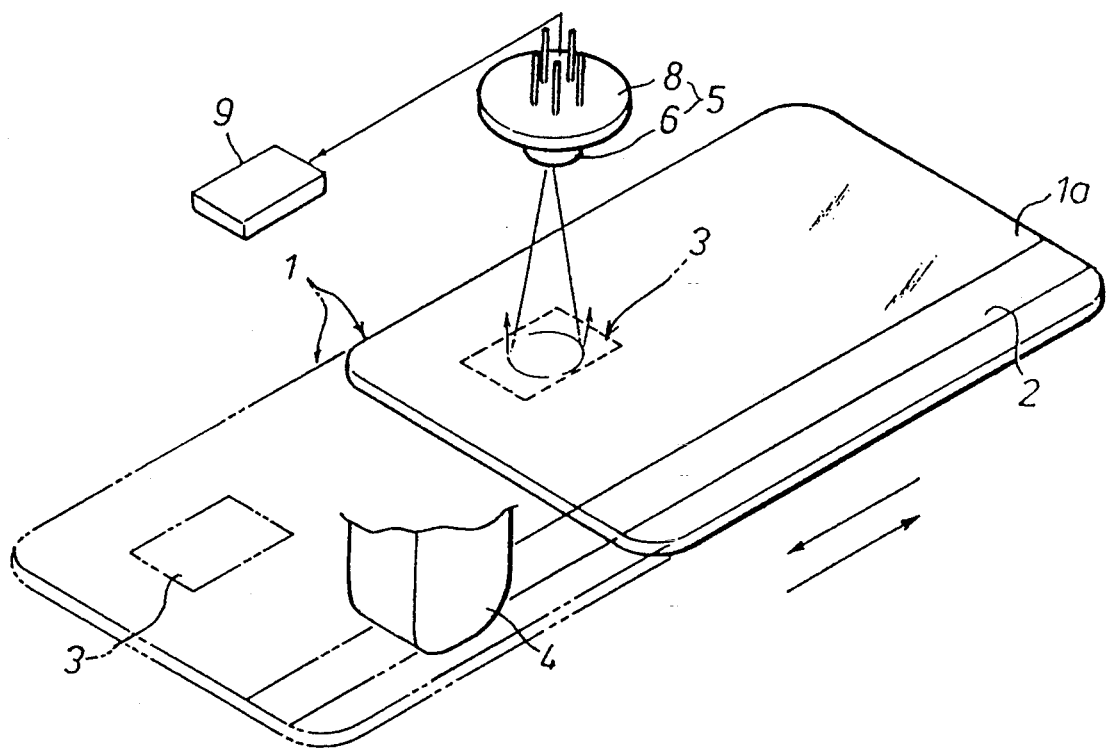
FIG. 1 is a perspective view of a card and the identification system for identifying the authenticity of the card according to the present invention.

In the preferred embodiment illustrated in FIGS. 1 through 6, a magnetic card 1 is given as an example of article the authenticity of which is desired to be identified according to the present invention. As illustrated in FIG. 1, a magnetic stripe 2 extends longitudinally on a surface 1a of the card 1. Further, an identification seal 3 serving as a light reflecting region having a unique diffractive property as described hereinafter is provided on the surface 1a.

Figure 2:
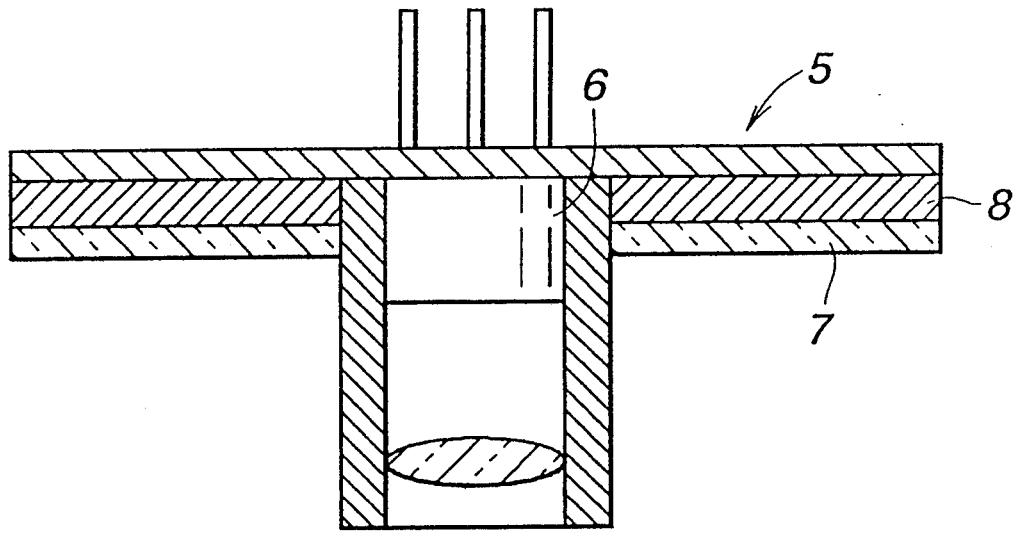
FIG. 2 is a side sectional view of a light emitting device and a light receiving device used in the system illustrated in FIG. 1.
Figure 3:
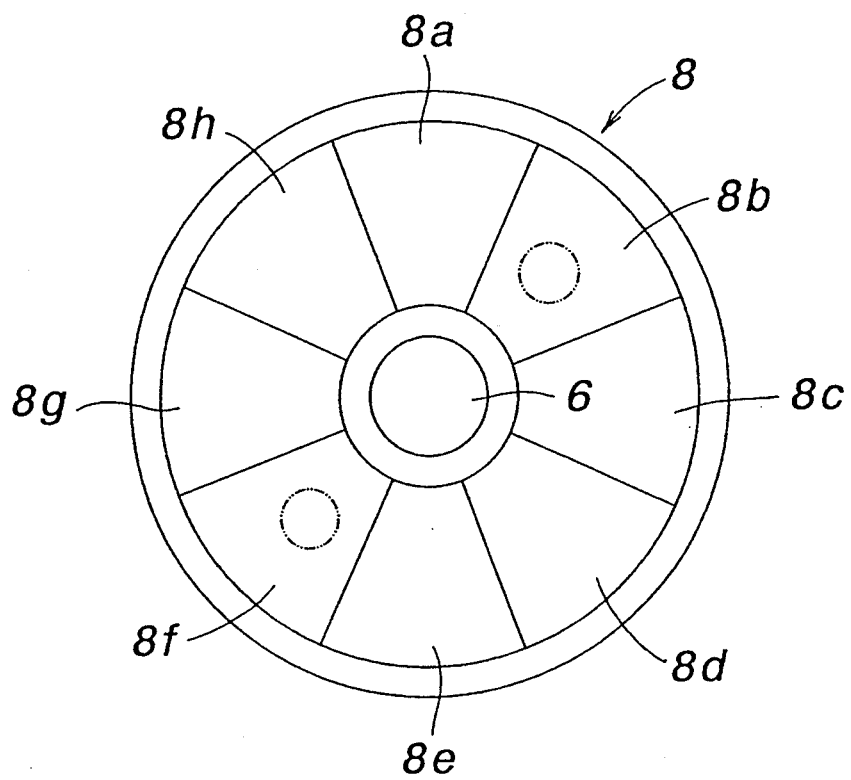
FIG. 3 is a plan view of the light emitting device and the light receiving device.

Meanwhile, a magnetic head 4 is provided inside a reader/writer for the card 1 so as to oppose the magnetic stripe 2 as the card 1 is conveyed in the reader/writer by a conveying unit not shown in the drawing. A light emitting/receiving unit 5 is also provided in the reader/writer so as to oppose the identification seal 3 as the card 1 is conveyed therein. This light emitting/receiving unit 5 comprises a light emitting device 6 for impinging illuminating laser light having the wavelength of 780 nm and linearly polarized in a certain direction upon the identification seal 3 provided on the surface 1a of the card 1, and an annular light receiving device 8 surrounding this light emitting device 6 (FIG. 3). The surface of the light receiving device 8 is covered by a polarization filter 7 which allows transmission of only the light linearly polarized in the above mentioned direction (FIG. 2). The light emitting device 6 directly opposes the identification seal 3 when the card 1 is conveyed to a prescribed position inside the reader/writer. The light receiving device 8 consists of a multi-segment photodiode which is divided by radial lines into eight segments 8a through 8h each capable of individually detecting light. The light receiving device 8 is connected to a determination unit 9 which comprises a CPU, memory and an I/F circuit of known type, and determines the authenticity of the card 1 as illustrated in FIG. 1.

Figure 4:
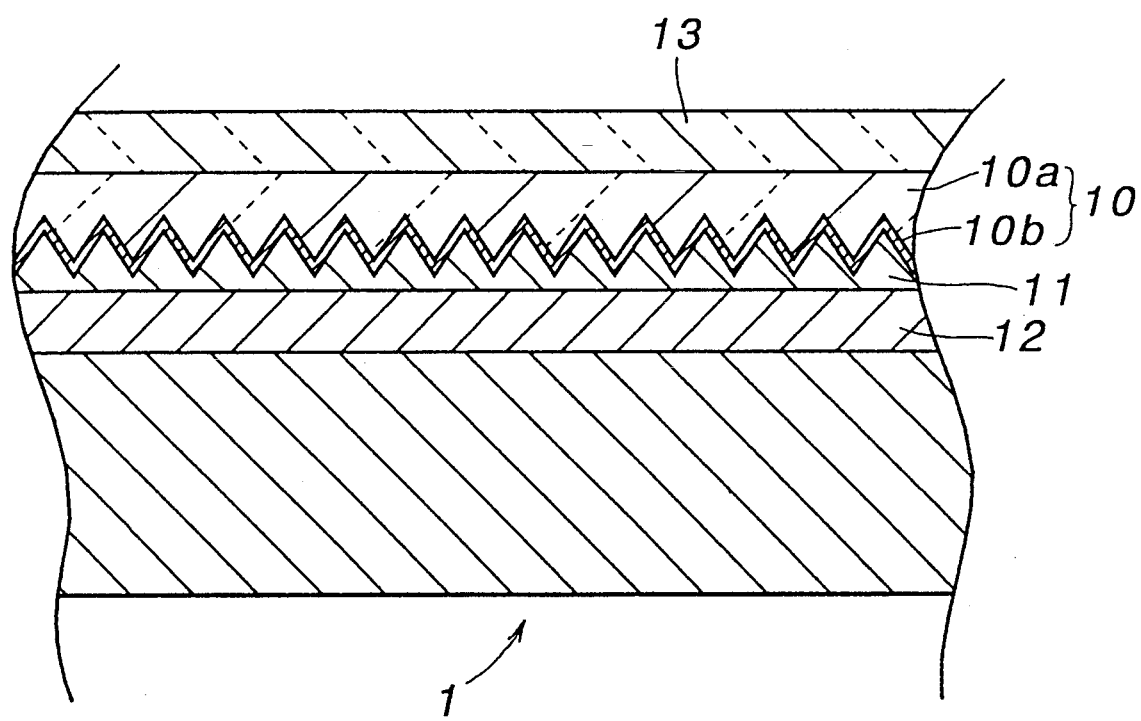
FIG. 4 is an enlarged sectional view of the identification region.
Figure 5:
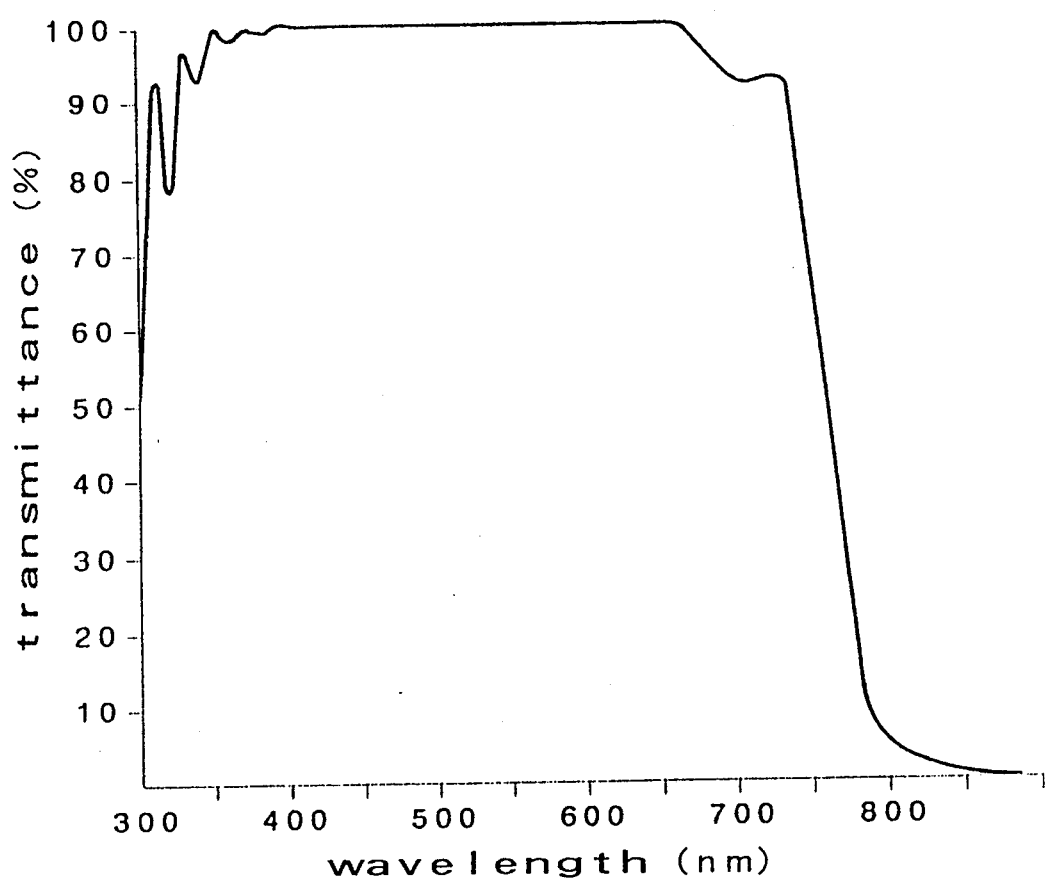
FIG. 5 is a graph showing the relationship between the/wavelength of the illuminating light and the transmittance of the light reflecting layer.

As best illustrated in FIG. 4, the identification region 3 comprises a hologram layer 10 consisting of a hologram forming layer 10a and an underlying light reflecting layer 10b, an adhesive layer 11 layered below the hologram layer 10 and serving also as a cushion layer, and a film-like polarization plane rotating layer 12 provided between the adhesive layer 11 and the surface 1a of the card 1. The surface of the hologram layer 10 is covered by a protective layer 13.

The hologram forming layer 10a allows transmission of light while the light reflecting layer 10b comprises mutually interleaved layers of sodium hexafluoralminate ($Na_3AlF_6$) having a relatively small index of refraction and zinc sulphate ($ZnS$) having a relatively large index of refraction so that the light reflecting layer 10b demonstrates a high transmittance (approximately 100%) for illuminating light in the visible light band (380 to 700 nm in wavelength) and a low transmittance for illuminating light in the infrared light band (700 nm or longer in wavelength). Therefore, this hologram layer is essentially invisible to human eyes, and has such a diffractive property that infrared light impinged squarely thereon is diffracted and reflected onto a pair of segments diagonally opposing each other on either side of the light emitting device 6.

On the other hand, the polarization plane rotating layer 12 is made by extending polycarbonate resin having a relatively pronounced double refractive property. The thickness of the polarization plane rotating layer 12 is determined in such a manner that one quarter of the wavelength of the laser light emitted from the light emitting device 6 corresponds to the amount of double refraction of this layer. Therefore, as the component of the incident laser light which has transmitted through the light reflecting layer lob is passed through this polarization plane rotating layer 12, reflected by the surface 1a of the card 1, and again passed through the polarization plane rotating layer 12, its plane of polarization is rotated by 90 degrees.

Figure 6:
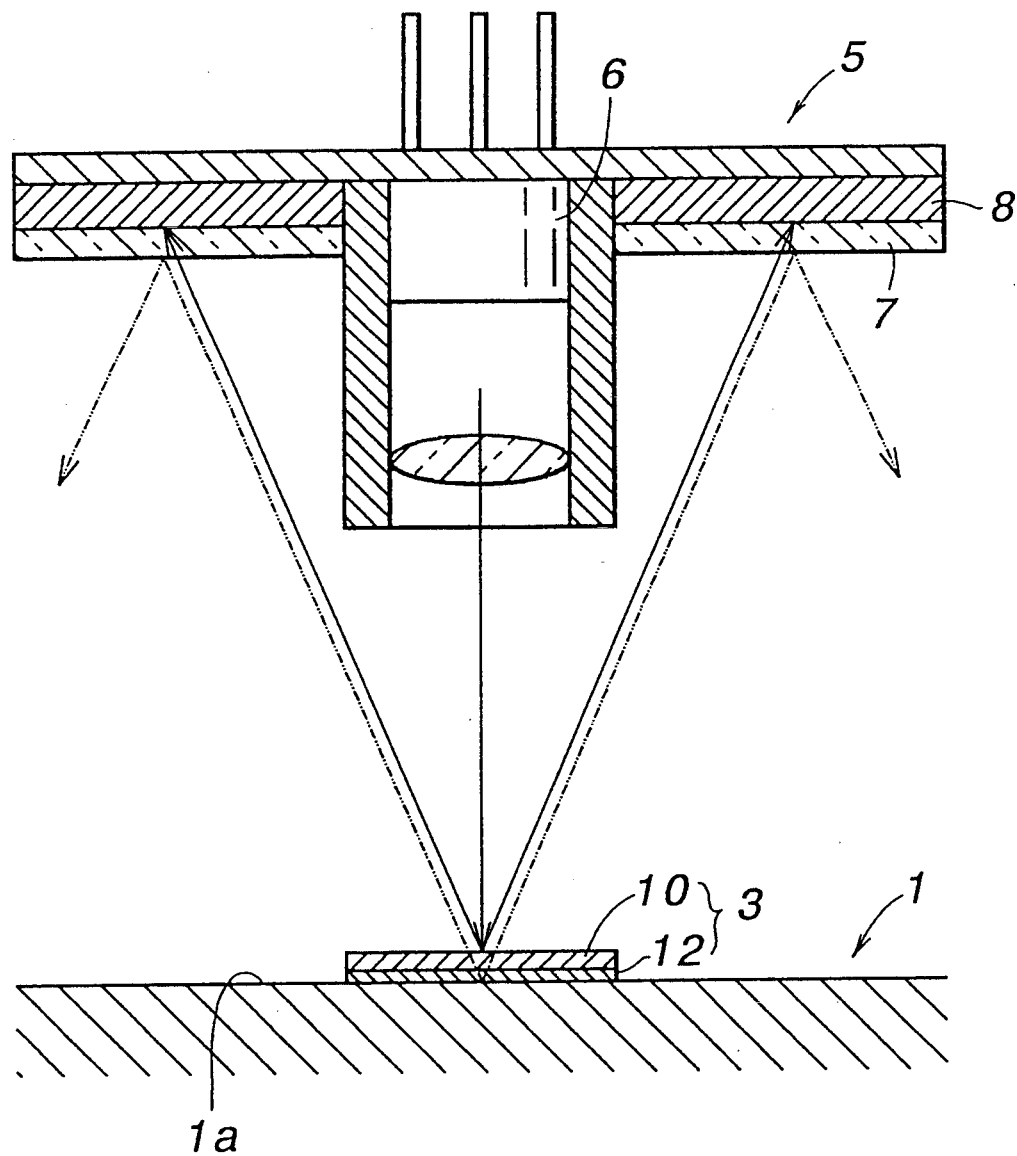
FIG. 6 is a side sectional view illustrating the operation of the present embodiment.

When actually identifying the authenticity of the card 1, the card 1 is conveyed until the identification seal 3 squarely opposes the light emitting device 6 of the light emitting/receiving unit 5. Then, illuminating light having the wavelength of 780 nm and linearly polarized in the prescribed direction is impinged from the light emitting device 6 onto the identification seal 3. The light diffracted and reflected by the identification seal 3 is transmitted through the polarization filter 7 before it is captured by specific segments 8a through 8h of the light receiving device 8, and the authenticity of the card 1 is identified according to the intensity of the light received by them. In this case, as the light which has passed through the light reflecting layer 10b travels both ways through the polarization plane rotating layer 12 before it reaches the polarization filter 7, its plane of polarization is rotated by 90 degrees. Therefore, the light is able to reach the polarization filter 7, but cannot pass through the polarization filter 7 nor reach the light receiving device 8. Thus, even when the surface 1a of the card 1 has a high coefficient of reflection, there is substantially no possibility of causing any erroneous detection (FIG. 6).

Therefore, even when a potential forger has obtained this card 1 with illicit intention, because the identification seal is hardly visible with naked eyes and its position is therefore hard to identify, and because the analysis of the reflective property of the hologram and the forgery of the hologram are both technically difficult, and prohibitively expensive, it is practically impossible for him to commit the forgery of the card.

It is obvious that the present invention is not limited by the above embodiment but can be implemented in various other forms. For instance, the hologram was prepared in such a manner that the illuminating light was diffracted onto two of the segments 8a through 8h of the light receiving device 8, but may also be prepared in such a manner that the illuminating light is diffracted onto four or more of the segments 8a through 8h of the light receiving device 8.

In the above described embodiment, the identification region was affixed to a magnetic card 1 serving as an information storage card, but similar results can be achieved even when they are affixed to checks, promissory notes, gift certificates, and other monetary papers, and general commercial goods or the packages therefor. In this case, by placing a mask having an opening in a prescribed position over the card 1, and selecting the position of the opening so as to correspond to the identification seal affixed to the card, it is possible to identify the identification seal by using a hand-carried hand scanner. When the monetary papers are desired to be identified, although they tend to deform very easily, because the properties of hologram and diffraction grating are not substantially affected even when there is an angular deformation of, for instance, five degrees, no significant problems are created. For this reason, such identification seals can be affixed to curved parts of goods such as tennis racket handles, and can be used satisfactorily for the purpose of identifying the authenticity of such goods.

Further, in the above described embodiment, hologram was used for the identification mark of the identification seal affixed to the card 1, similar results can be obtained when diffraction grating is used instead.

Thus, according to the system for identifying an article of the present invention, by providing light emitting means for emitting light having a prescribed wavelength and linearly polarized in a prescribed direction, an identification region defined on the article, the identification region including a light reflecting layer which is adapted to transmit visible light and reflect light of wavelength other than those of visible light with a certain reflective directivity property, and a polarization plane rotating layer made of optically anisotropic material which rotates linearly polarized light of the certain wavelength by double refraction, light receiving means for receiving the light reflected by the light reflecting layer, and a polarization filter for allowing transmission of only the rotated linearly polarized light placed on a light receiving surface of the light receiving means, the visible light is not reflected by the light reflecting layer and the light reflecting layer is therefore made transparent so that the identification system would not affect the design of the article, and the freedom of design is substantially improved. Further, the light reflected by the surface of the article which tends to give rise to noises for the process of identification can be shut off, and the reliability of identification is thereby improved. Thus, the present invention offers a significant improvement over the prior art.

Although the present invention has been described in terms of a specific embodiment thereof, it is possible to modify and alter details thereof without departing from the spirit of the present invention.

What we claim is:

1. An article identification system for identifying the authenticity of an article, comprising:
   identification means provided on said article;
   light emitting means for impinging light emitted therefrom onto said identification means, said light having a prescribed wavelength, and linearly polarized in a prescribed direction;
   light detecting means for detecting light reflected by said identification means; and
   control means for evaluating light detected by said light detecting means and determining the authenticity of said article associated with said identification means;
   wherein:
   said identification means comprises at least a first layer having a reflective property adapted to be detected by said light detecting means for identification purpose, and a second layer, said second layer underlying said first layer;
   said light detecting means being provided with a filter which selectively allows transmission of light having a certain polarization direction, and said second layer being provided with such a polarization plane rotating property that light which has passed through said first and second layers and reflected by a surface underlying said second layer onto said light detecting means is substantially prevented from passing through said filter.

2. An article identification system according to claim 1, wherein said wavelength of said light emitted from said light emitting means is outside a visible light band, and said first layer reflects said light from said light emitting means and said first layer is substantially transparent to light of wavelength inside said visible light band.

3. An article identification system according to claim 1, wherein said second layer has such a polarization plane rotating property that polarized light which has passed through said second layer twice has a polarization direction rotated by approximately 90 degrees, and said filter provided on said light detecting means is so oriented as to shut off said light which has had a polarization direction thereof rotated by 90 degrees by said second layer.

4. An article identification system according to claim 1, wherein said light reflecting layer comprises a hologram.

5. An article identification system according to claim 1, wherein said light reflecting layer comprises a diffraction grating.

6. An article identification system according to claim 1, wherein said surface is a surface of a third layer.

7. An article identification system according to claim 1, wherein said surface is a surface of said article.

* * * * *